No. 882,061. PATENTED MAR. 17, 1908.
F. GREINER.
STEP BEARING.
APPLICATION FILED JULY 23, 1907.

UNITED STATES PATENT OFFICE.

FRIEDRICH GREINER, OF BERLIN, GERMANY, ASSIGNOR TO THE FIRM OF MASCHINENBAU-ANSTALT ALTENESSEN A. G., OF ALTENESSEN, GERMANY.

STEP-BEARING.

No. 882,061.

Specification of Letters Patent.

Patented March 17, 1908.

Application filed July 23, 1907. Serial No. 385,143.

*To all whom it may concern:*

Be it known that I, FRIEDRICH GREINER, a subject of the German Emperor, and residing at Nachodstrasse 39, Berlin, Germany, have invented certain new and useful Improvements in Step-Bearings, of which the following is a specification.

The present invention relates to a step-bearing with balls arranged between parts which move relatively to one another.

Figure 1:
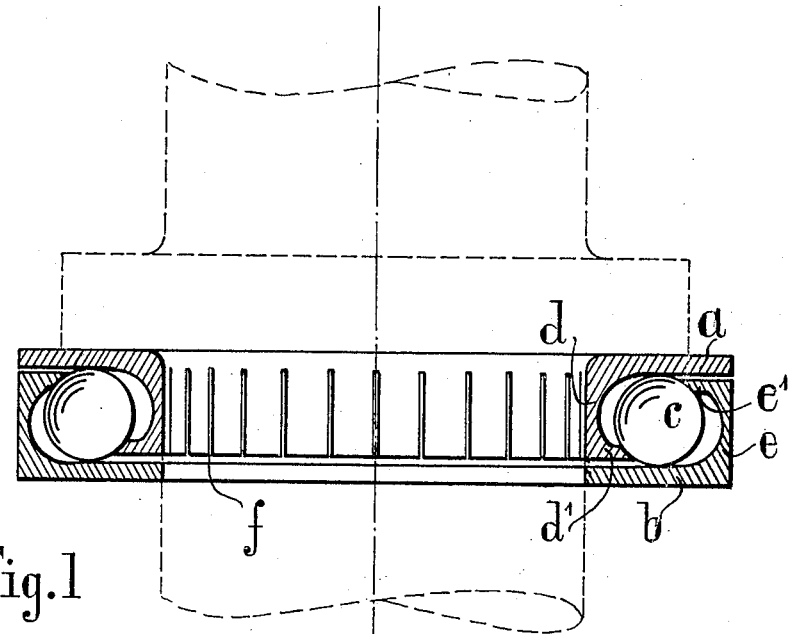
Figure 2:
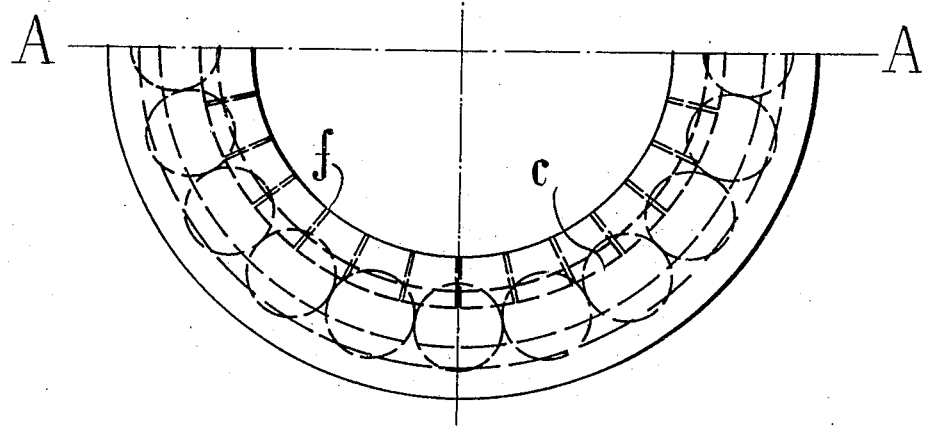

It is represented in the drawing in two figures, Figure 1 being a cross-section in the plane A—A of Fig. 2, and Fig. 2 a plan.

The bearing consists of an upper annular disk $a$, a lower annular disk $b$ and a number of balls $c$ between the two disks. The upper disk $a$ has a cylindrical flange $d$ extending downwards and the lower disk $b$ has a cylindrical flange $e$ extending upwards in such a manner that the disks with their flanges form an annular chamber for the reception of the balls $c$. Edges $d'$ and $e'$, the distance between which measured at right angles to the axis of the step-bearing is less than the diameter of the balls $c$, are on the hollow cylinders $d$ and $e$ respectively and project into the annular chamber. It is thus impossible for the balls to fall out of the bearing as soon as the same is once assembled. In order to erect the bearing the hollow cylinders $d$ and $e$ are made resilient with regard to the annular disks $a$ and $b$. By employing suitable force, therefore, the distance between the two edges $d'$ and $e'$ can be increased so much that the edges slide over the equator of the balls. For this purpose one of the hollow cylinders at its edge is provided with incisions $f$ whereby a row of resilient tongues independent of one another are produced, and the cylinder not provided with incisions is also flexible.

What I claim as my invention and desire to secure by Letters Patent is:—

1. A step-bearing comprising in combination an upper annular disk having a resilient cylindrical flange extending downwards, a lower annular disk having a resilient cylindrical flange extending upwards, said disks and flanges forming an annular chamber, and a plurality of balls in said chamber, said flanges having edges projecting into said annular chamber, the distance between said edges measured at right angles to the axis of the step-bearing being less than the diameter of said balls.

2. A step-bearing comprising in combination an upper annular disk having a resilient cylindrical flange extending downwards, a lower annular disk having a resilient cylindrical flange extending upwards, the flange of one of said disks having longitudinal incisions, said disks and flanges forming an annular chamber, and a plurality of balls in said chamber, said flanges having edges projecting into said annular chamber, the distance between said edges measured at right angles to the axis of the step-bearing being less than the diameter of said balls.

In testimony whereof, I affix my signature in the presence of two witnesses.

FRIEDRICH GREINER.

Witnesses:
   HENRY HASPER,
   WOLDEMAR HAUPT.